United States Patent
Ooi (10) Patent No.: US 8,698,866 B2
(45) Date of Patent: Apr. 15, 2014

(54) OPTICAL SCANNING DEVICE AND IMAGE FORMING APPARATUS PROVIDED WITH THE SAME

(75) Inventor: Hironobu Ooi, Osaka (JP)

(73) Assignee: Kyocera Mita Corporation (JP)

( * ) Notice: Subject to any disclaimer, the term of this patent is extended or adjusted under 35 U.S.C. 154(b) by 102 days.

(21) Appl. No.: 13/241,481

(22) Filed: Sep. 23, 2011

(65) Prior Publication Data
US 2012/0075404 A1 Mar. 29, 2012

(30) Foreign Application Priority Data

Sep. 29, 2010 (JP) ................................. 2010-218425
Sep. 29, 2010 (JP) ................................. 2010-218452

(51) Int. Cl.
*B41J 15/14* (2006.01)
*B41J 27/00* (2006.01)

(52) U.S. Cl.
USPC .......................................... 347/242; 347/257

(58) Field of Classification Search
USPC .......... 347/230, 231, 241–245, 256–261, 263
See application file for complete search history.

(56) References Cited

U.S. PATENT DOCUMENTS

| | | | | |
|---|---|---|---|---|
| 5,539,447 A | * | 7/1996 | Akuta et al. | 347/263 |
| 6,593,951 B2 | * | 7/2003 | Yokoyama et al. | 347/138 |
| 6,933,959 B2 | * | 8/2005 | Kojima et al. | 347/257 |
| 2002/0036683 A1 | | 3/2002 | Yokoyama et al. | |
| 2006/0187513 A1 | * | 8/2006 | Ohsugi | 359/212 |

FOREIGN PATENT DOCUMENTS

| | | | | |
|---|---|---|---|---|
| JP | 1058750 | | 3/1998 | |
| JP | 11194293 | | 7/1999 | |
| JP | 11194293 A | * | 7/1999 | ............ G02B 26/10 |
| JP | 2000258712 | | 9/2000 | |
| JP | 2002-148542 | | 5/2002 | |
| JP | 2003270568 | | 9/2003 | |
| JP | 200531285 | | 2/2005 | |
| JP | 200678903 | | 3/2006 | |
| JP | 2006267398 | | 10/2006 | |
| JP | 200896649 | | 4/2008 | |
| JP | 201096849 | | 4/2010 | |
| JP | 2011039306 A | * | 2/2011 | ................ B41J 2/44 |

* cited by examiner

*Primary Examiner* — Hai C Pham
(74) *Attorney, Agent, or Firm* — Gerald E. Hespos; Michael J. Porco; Matthew T. Hespos (57) ABSTRACT

An optical scanning device includes a housing, the interior of which is partitioned into a first compartment and a second compartment by a base; a light source arranged in the first compartment and adapted to emit a beam; a first optical component arranged on an optical path of the beam in the first compartment; a second optical component arranged on the optical path of the beam in the second compartment; an aperture formed in the base to allow the beam to pass from the first compartment to the second compartment or from the second compartment to the first compartment; and a reinforcing member for reinforcing the rigidity of the base near the aperture.

10 Claims, 8 Drawing Sheets

OPTICAL SCANNING DEVICE AND IMAGE FORMING APPARATUS PROVIDED WITH THE SAME

BACKGROUND OF THE INVENTION

1. Field of the Invention

The present invention relates to an optical scanning device for optically scanning a photoconductive member and an image forming apparatus provided with the same such as a copier or a printer.

2. Description of the Related Art

In an image forming apparatus such as a copier or a printer, a photoconductive member having a surface uniformly charged by a charger is optically scanned by an optical scanning device, whereby an electrostatic latent image corresponding to image information is formed on the surface. The electrostatic latent image is visualized as a toner image using toner as developer by a developing device. This toner image is heated and pressed by a fixing device to be fixed to a sheet after being transferred to the sheet by a transfer device. A series of image forming operations end when the sheet having the toner image fixed thereto is discharged to the outside of the apparatus.

The optical scanning device for optically scanning the photoconductive member to form an electrostatic latent image on the surface of the photoconductive member includes a light source, a polarizer for polarizing a light beam emitted from the light source, an imaging lens for converting the light beam polarized by the polarizer into constant-speed scanning light, a reflecting mirror for reflecting the constant-speed scanning light and introducing it to the photoconductive member and the like. These optical components are housed in a housing.

In a conventional optical scanning device, in order to make the optical scanning device smaller and stronger while ensuring a necessary optical path length of the entire optical system of the optical scanning device, it has been proposed to use a housing having an H-shaped structure composed of a base and a frame-shaped side wall surrounding the base. In this housing, a polygon mirror as a polarizer is arranged in the center of the base and a plurality of optical components such as an imaging lens and a reflecting mirror are arranged and distributed in upper and lower spaces partitioned by the base in the housing.

Since the optical components such as the imaging lens and the reflecting mirror are respectively separately arranged in the upper and lower spaces partitioned by the base in the housing in the above conventional optical scanning device, the base is formed with an aperture for allowing the passage of light. If the aperture is formed in the base, rigidity is reduced near the aperture and this part is more likely to vibrate than other parts due to the influence of vibration of the polygon mirror and the image forming apparatus. If the vicinity of the aperture of the base is likely to vibrate, the optical components arranged at the opposite sides of the aperture vibrate. Thus, there is a problem that image degradation such as jitter occurs.

SUMMARY OF THE INVENTION

An object of the present invention is to prevent the occurrence of image degradation by preventing a reduction in rigidity near an aperture formed in a base of a housing and suppressing vibration of optical components arranged on the base.

In order to accomplish this object, one aspect of the present invention is directed to an optical scanning device, including a housing, the interior of which is partitioned into a first compartment and a second compartment by a base; a light source arranged in the first compartment and adapted to emit a beam; a first optical component arranged on an optical path of the beam in the first compartment; a second optical component arranged on the optical path of the beam in the second compartment; an aperture formed in the base to allow the beam to pass from the first compartment to the second compartment or from the second compartment to the first compartment; and a reinforcing member for reinforcing the rigidity of the base near the aperture.

Another aspect of the present invention is directed to an optical scanning device, including a housing, the interior of which is partitioned into upper and lower compartments by a base; an optical component housed in the housing and including a light source, a polarizer for polarizing a beam emitted from the light source, an imaging lens for converting the beam polarized by the polarizer into constant-speed scanning light, and a reflecting mirror for reflecting the constant-speed scanning light and introducing it to a photoconductive member; an aperture formed in the base and adapted to allow the passage of light; and a light transmissive member to be fitted into the aperture.

Still another aspect of the present invention is directed to an image forming apparatus, including, an image carrier, on the circumferential surface of which an electrostatic latent image is to be formed; and an optical scanning device for irradiating the circumferential surface with light; wherein this optical scanning device has the above construction.

These and other objects, features and advantages of the present invention will become more apparent upon reading the following detailed description along with the accompanying drawings.

DETAILED DESCRIPTION OF THE PREFERRED EMBODIMENTS

Hereinafter, embodiments of the present invention are described in detail with reference to the drawings.

[Image Forming Apparatus]

Figure 1:
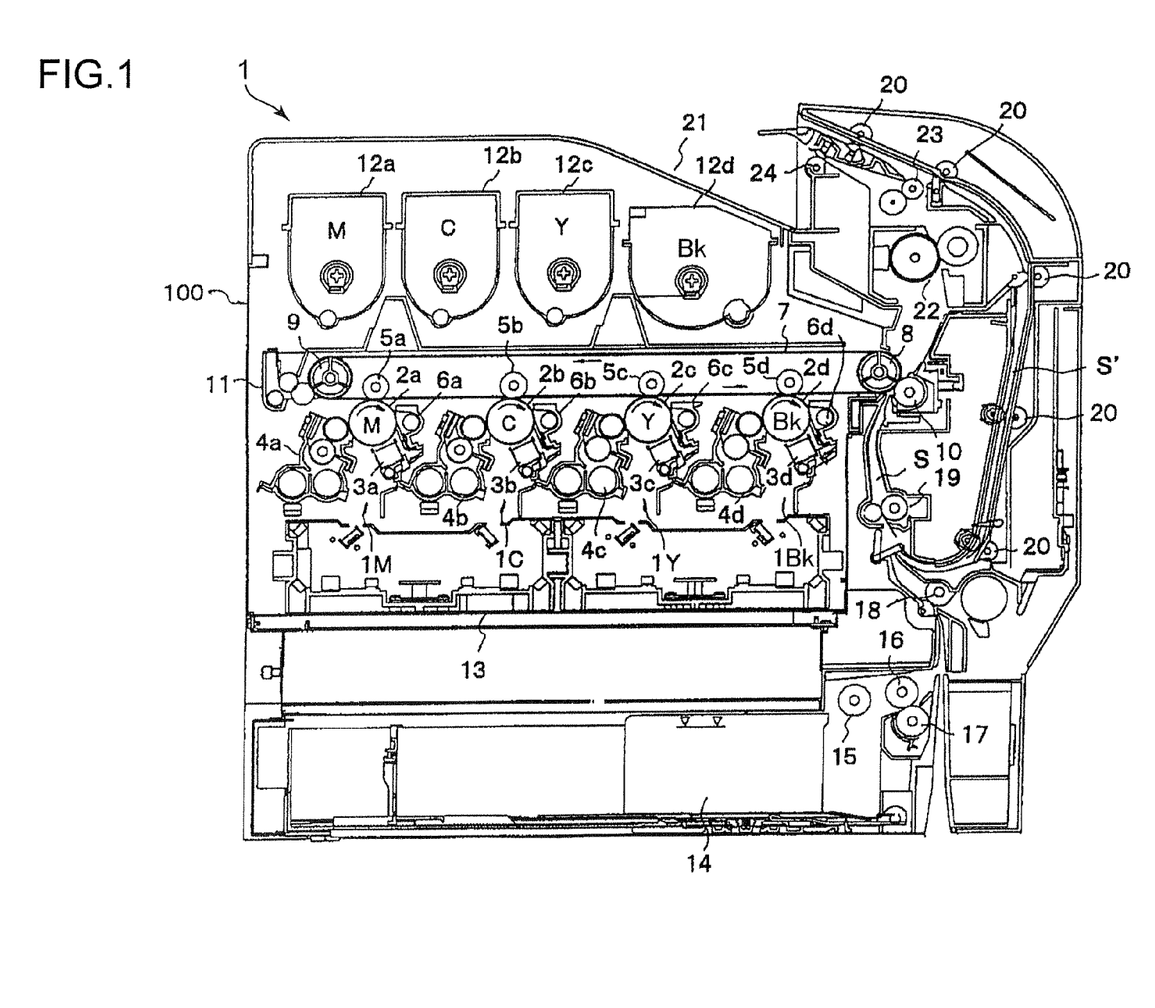
FIG. 1 is a side view in section of an image forming apparatus according to one embodiment of the invention.

FIG. 1 is a sectional view of a color laser printer 1 as one embodiment of an image forming apparatus according to the present invention. The color laser printer 1 is a tandem type, and a magenta image forming unit 1M, a cyan image forming unit 1C, a yellow image forming unit 1Y and a black image forming unit 1Bk are tandemly arranged at constant intervals in a central part of a main body 100 thereof.

Photoconductive drums (image carriers) 2a, 2b, 2c and 2d as photoconductive members are arranged in the respective image forming units 1M, 1C, 1Y and 1Bk. Chargers 3a, 3b, 3c and 3d, developing devices 4a, 4b, 4c and 4d, transfer rollers 5a, 5b, 5c and 5d and drum cleaners 6a, 6b, 6c and 6d are respectively arranged around the corresponding photoconductive drums 2a to 2d.

The photoconductive drums 2a to 2d are drum-shaped photoconductive members and driven and rotated at a predetermined process speed in directions of shown arrows (clockwise directions) by unillustrated drive motors. The chargers 3a to 3d uniformly charge surfaces of the photoconductive drums 2a to 2d to a predetermined potential by charging biases applied from unillustrated charging bias power supplies.

The developing devices 4a to 4d respectively contain magenta (M) toner, cyan (C) toner, yellow (Y) toner and black toner (Bk) and cause the toners of the respective colors to adhere to respective electrostatic latent images formed on the respective photoconductive drums 2a to 2d, thereby developing the respective electrostatic latent images into toner images of the respective colors.

The transfer rollers 5a to 5d are so arranged as to be able to come into contact with the respective photoconductive drums 2a to 2d via an intermediate transfer belt 7 at respective primary transfer portions. The intermediate transfer belt 7 is mounted between a drive roller 8 and a tension roller 9 and arranged to be able to turn above the respective photoconductive drums 2a to 2d. The drive roller 8 is so arranged as to be able to come into contact with a secondary transfer roller 10 via the intermediate transfer belt 7 in a secondary transfer portion. Further, a belt cleaner 11 is provided near the tension roller 9.

Toner containers 12a, 12b, 12c and 12d for respectively supplying the toners of the respective colors to the corresponding developing devices 4a to 4d are arranged in a row above the respective image forming units 1M, 1C, 1Y and 1Bk in the printer main body 100.

Two optical scanning devices 13 are juxtaposed in a sheet conveying direction below the respective image forming units 1M, 1C, 1Y and 1Bk in the printer main body 100. A sheet cassette 14 is detachably mounted below these optical scanning devices 13 at the bottom of the printer main body 100. A plurality of unillustrated sheets are stacked and stored in the sheet cassette 14. A pickup roller 15 for picking up sheets from the sheet cassette 14 and a feed roller 16 and a retard roller 17 for separating the pickup up sheets and feeding them one by one to a conveyance path S are provided near the sheet cassette 14.

The conveyance path S is a conveyance path vertically extending at a lateral side of the printer main body 100 and includes a pair of conveyor rollers 18 for conveying the sheet and a pair of registration rollers 19. The pair of registration rollers 19 feed the sheet at a predetermined timing to the secondary transfer portion where the drive roller 8 and the secondary transfer roller 10 are in contact after causing the sheet to temporarily stop. Lateral to the conveyance path S, another conveyance path S' used in the case of forming images on both sides of a sheet is formed, and a plurality of pairs of reversing rollers 20 are provided at appropriately intervals in this conveyance path S'.

The conveyance path S extends up to a discharge tray 21 provided on the upper surface of the printer main body 100 and a fixing device 22 and pairs of discharge rollers 23, 24 are provided at intermediate positions of the conveyance path S.

The fixing device 22 includes a fixing roller and a pressing roller and performs a fixing process to fix a toner image to a sheet by heating and pressing the sheet passing through a nip portion between these rollers.

Next, an image forming operation by the color laser printer 1 having the above construction is described. When an image formation start signal is issued, the respective photoconductive drums 2a to 2d are driven and rotated at the predetermined process speed in the shown arrow directions (clockwise directions) in the respective image forming units 1M, 1C, 1Y and 1Bk. The surfaces of these photoconductive drums 2a to 2d are uniformly charged by the chargers 3a to 3d. Further, the respective optical scanning devices 13 emit light beams modulated by color image signals of the respective colors to irradiate the surfaces of the respective photoconductive drums 2a to 2d with these light beams, whereby electrostatic latent images corresponding to the color image signals of the respective colors are respectively on the respective photoconductive drums 2a to 2d.

Then, the magenta toner is attached to the electrostatic latent image formed on the photoconductive drum 2a of the magenta image forming unit 1M by the developing device 4a having a developing bias with the same polarity as the charge polarity of the photoconductive drum 2a applied thereto, whereby the electrostatic latent image is visualized as a magenta toner image. This magenta toner image is primarily transferred onto the intermediate transfer belt 7 driven and rotated in a shown arrow direction by the action of the transfer roller 5a having a primary transfer bias with a polarity opposite to that of the toner applied thereto in the primary transfer portion (transfer nit portion) between the photoconductive drum 2a and the transfer roller 5a.

The intermediate transfer belt 7 having the magenta toner image primarily transferred thereto in a manner as described above moves to the next cyan image forming unit 1C. Also in the cyan image forming unit 1C, a cyan toner image formed on the photoconductive drum 2b is transferred onto the magenta toner image on the intermediate transfer belt 7 in a superimposition manner at the primary transfer portion in the same manner as described above.

Thereafter, yellow and black toner images respectively formed on the photoconductive drums 2c, 2d of the yellow and black image forming units 1Y and 1Bk are successively similarly superimposed on the magenta and cyan toner images transferred onto the intermediate transfer belt 7 in a superimposition manner at the respective primary transfer portions. In this way, a full color toner image is formed on the intermediate transfer belt 7. Note that transfer residual toners remaining on the respective photoconductive drums 2a to 2d without being transferred to the intermediate transfer belt 7 are removed by the respective drum cleaners 6a to 6d, and the respective photoconductive drums 2a to 2d are prepared for the next image formation.

In synchronization with a timing at which the leading end of the full color toner image on the intermediate transfer belt 7 reaches the secondary transfer portion (transfer nit portion) between the drive roller 8 and the secondary transfer roller 10, a sheet fed from the sheet cassette 14 to the conveyance path S by the pickup roller 15, the feed roller 16 and the retard roller 17 is conveyed to the secondary transfer portion by the pair of registration rollers 19. The full color toner image is secondarily transferred at one time from the intermediate transfer belt 7 to the sheet conveyed to the secondary transfer portion by the secondary transfer roller 10 having a secondary transfer bias with a polarity opposite to that of the toner applied thereto.

The sheet having the full color toner image transferred thereto is conveyed to the fixing device 22 and the full color toner image is heated and pressed to be thermally fixed to a surface of the sheet. The sheet having the toner image fixed thereto is discharged onto the discharge tray 21 by the pairs of discharge rollers 23, 24, whereby a series of image forming operations end. Note that transfer residual toner remaining on the intermediate transfer belt 7 without being transferred to the sheet is removed by the belt cleaner 11 and the intermediate transfer belt 7 is prepared for the next image formation.

[Optical Scanning Device According to First Embodiment]

Figure 2:
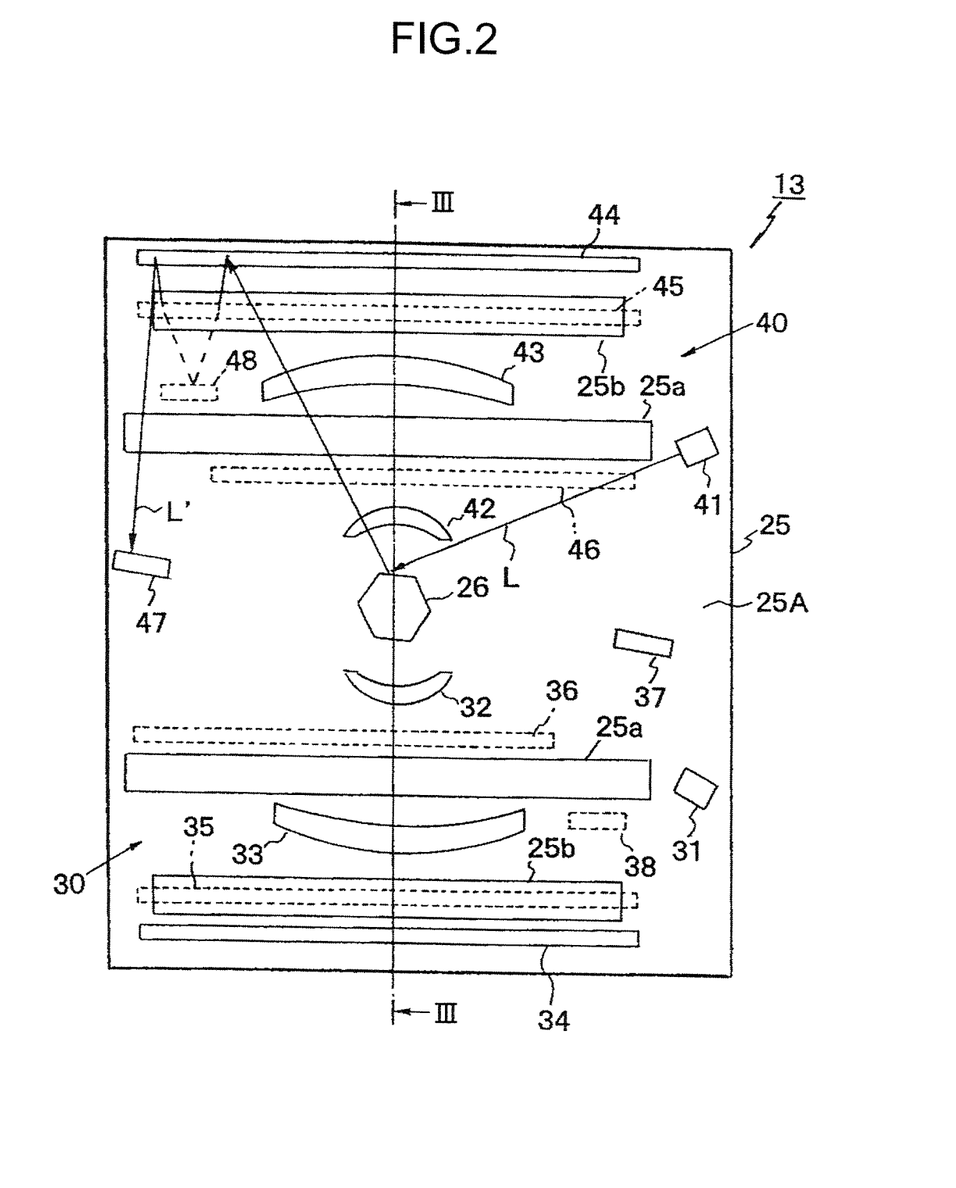
FIG. 2 is a plan view showing the internal structure of an optical scanning device according to a first embodiment of the invention.
Figure 3:
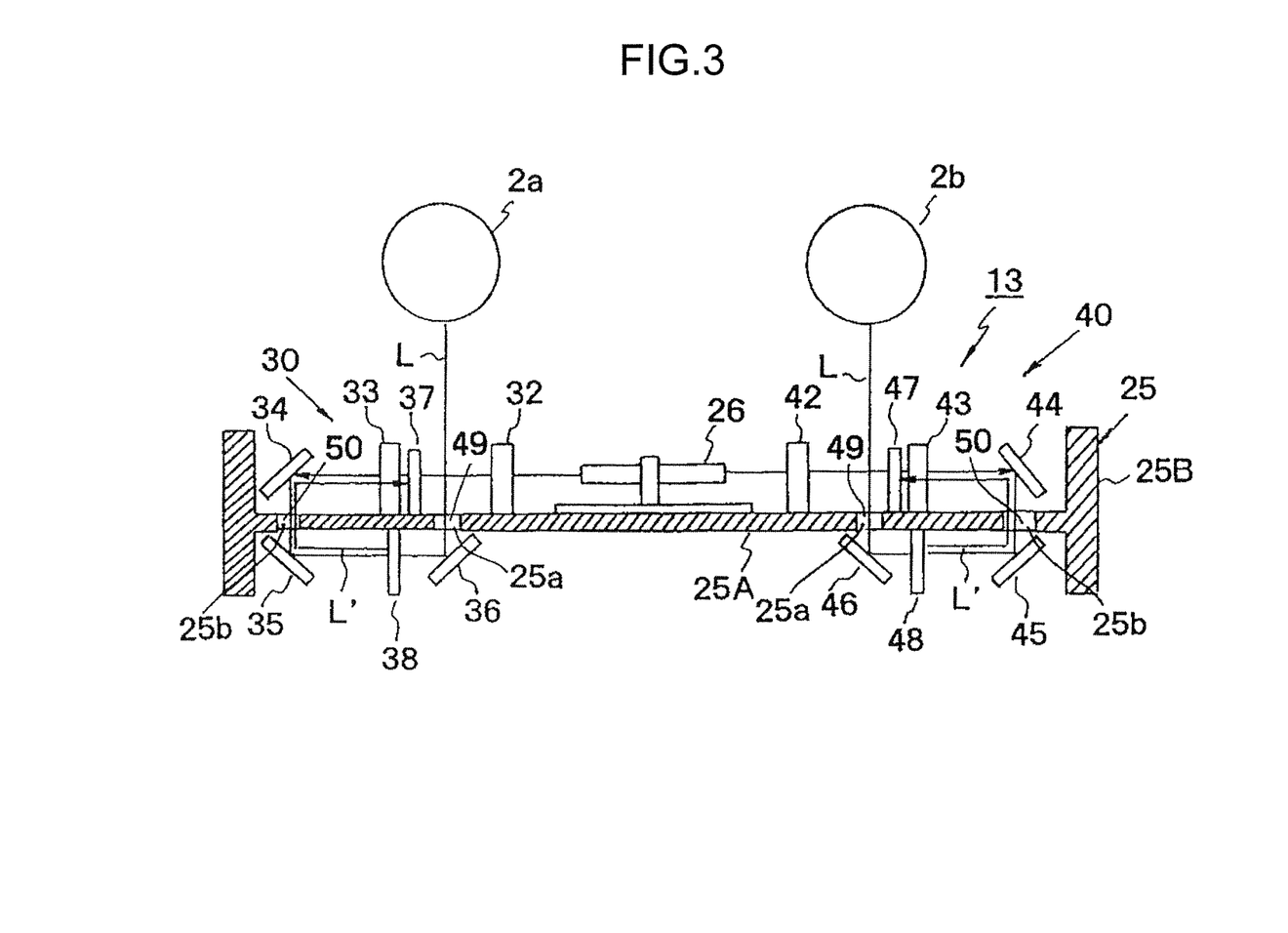
FIG. 3 is a sectional view along III-III of FIG. 2.

Next, the optical scanning device 13 according to a first embodiment is described with reference to FIGS. 2 and 3. FIG. 2 is a plan view showing the internal structure of one optical scanning device 13 and FIG. 3 is a sectional view along III-III of FIG. 2. Note that only one optical scanning device 13 is shown and described below since the two optical scanning devices 13 provided in the color laser printer 1 shown in FIG. 1 have the same basic construction. The one optical scanning device 13 shown here is for exposing and scanning the photoconductive drum 2a of the magenta image forming unit 1M and the photoconductive drum 2b of the cyan image forming unit 1C shown in FIG. 1.

The optical scanning device 13 includes an integrally formed housing 25 made of resin. As shown in FIG. 3, the housing includes a base 25A which is a horizontal flat plate member partitioning the interior space of the housing 25 into an upper space (first compartment) and a lower space (second compartment) and a frame-shaped side wall 25B surrounding the base 25A. A lateral cross-sectional shape of the base 25A and the side wall 25B is an H shape. A polygon mirror 26 (first optical component) as a polarizer is arranged in a central part of the upper space above the base 25A of the housing 25. Two scanning optical systems 30, 40 (first optical component and second optical component) are symmetrically arranged at the opposite sides of the polygon mirror 26 as a center in the upper and lower spaces partitioned by the base 25A in the housing 25.

The scanning optical systems 30, 40 include laser diodes 31, 41 (light sources) arranged on the upper surface of the base 25A in the housing 25. The laser diodes 31, 41 are arranged in the upper space of the housing 25 and generate beams (light beams L) having a predetermined wavelength. Respective optical components constituting the scanning optical systems 30, 40 are arranged on optical paths of the beams from the laser diodes 31, to the circumferential surfaces of the photoconductive drums 2a, 2b. Note that an unillustrated collimator lens is incorporated into each of the laser diodes 31, 41.

The light beams L emitted from the respective laser diodes 31, 41 are incident on the polygon mirror 26 driven and rotated at a predetermined speed in two symmetrical directions after being collimated into linear beams by the unillustrated collimator lenses. The respective light beams L incident on the polygon mirror 26 are polarized by the polygon mirror 26.

The respective scanning optical systems 30, 40 include first imaging lenses 32, 42, second imaging lenses 33, 43 and first reflecting mirrors 34, 44 arranged along propagation directions of the light beams L in the upper space above the base 25A, and second reflecting mirrors 35, 45 and third reflecting mirrors 36, 46 arranged along the propagation directions of the light beams L in the lower space below the base 25A.

The first imaging lenses 32, 42 and the second imaging lenses 33, 43 convert the light beams L polarized by the polygon mirror 26 into constant-speed scanning lights and focus the constant-speed scanning lights on the circumferential surfaces of the photoconductive drums 2a, 2b. The first reflecting mirrors 34, 44 are mirrors for reflecting the constant-speed scanning lights at 90° so that the scanning lights horizontally propagating in the upper space propagate toward the lower space. The second reflecting mirrors 35, 45 are mirrors for further reflecting the scanning lights reflected by the first reflecting mirrors 34, 44 and incident thereon at 90° and causing them to horizontally propagate in the lower space. The third reflecting mirrors 36, 46 are mirrors for further reflecting the scanning lights reflected by the second reflecting mirrors 35, 45 and incident thereon at 90° and causing them to propagate upward toward the circumferential surfaces of the photoconductive drums 2a, 2b through the upper space.

To enable the above scanning lights to be reflected through the base 25A, the base 25A is formed with two first apertures 25a and two second apertures 25b for allowing the passage of the scanning lights. The first apertures 25a are rectangular apertures long in a main scanning direction (lateral direction in FIG. 2) and arranged on optical paths connecting the third reflecting mirrors 36, 46 and the photoconductive drums 2a, 2b and between the first imaging lenses 32, 42 and the second imaging lenses 33, 43 on the base 25A. The second apertures 25b are rectangular apertures long in the main scanning direction and arranged on optical paths connecting the first reflecting mirrors 34, 44 and the second reflecting mirrors 35, 45.

As shown in FIG. 2, the respective scanning optical systems 30, 40 include two synchronization detectors (Beam Detect sensors) 37, 47. The synchronization detectors 37, 47 are arranged laterally to the first imaging lenses 32, 42 on the base 25A where the polygon mirror 26 is arranged (in the upper surface) and point-symmetrically with respect to the polygon mirror 26. These synchronization detectors 37, 47 are respectively arranged outside effective scanning ranges of the respective photoconductive drums 2a, 2b by the light beams L. Exposure-scanning (writing) start timings of the photoconductive drums 2a, 2b by the light beams L are determined by the synchronization detectors 37, 47 detecting light beams L' for synchronization detection.

The respective scanning optical systems 30, 40 further include mirrors 38, 48 for synchronization detection for reflecting the light beams L' for synchronization detection and introducing them to the synchronization detectors 37, 47. The mirrors 38, 48 for synchronization detection are respectively arranged outside the effective scanning ranges (at point-symmetrical positions with respect to the polygon mirror 26) on the lower surface of the base 25A (in the lower space).

The first reflecting mirrors 34, 44 and the second reflecting mirrors 35, 45 are arranged at intermediate positions of optical paths for synchronization detection from the polygon mirror 26 to the respective mirrors 38, 48 for synchronization detection. Further, the first imaging lenses 32, 42 and the second imaging lenses 33, 43 are arranged at intermediate positions of optical paths for synchronization detection from the polygon mirror 26 to the first reflecting mirrors 34, 44.

In the first embodiment, light transmissive members 49, 50 (reinforcing members) are further included which are fitted into the first and second apertures 25a, 25b respectively formed in the base 25A for the respective scanning optical systems 30, 40. The light transmissive members 49, 50 have a long and narrow rectangular shape slightly larger than the shape of the first and second apertures 25a, 25b and made of transparent parallel plates. The light transmissive members 49, 50 are respectively interference-fitted into the first and second apertures 25a, 25b.

Next, functions of the optical scanning device 13 constructed as described above are described. The light beams L emitted from the laser diodes 31, 41 provided in the respective scanning optical systems 30, 40 in one optical scanning device 13 are incident on the polygon mirror 26 driven and rotated at the predetermined speed in two symmetrical directions after being collimated into linear beams by the unillustrated collimator lens.

After being polarized by the polygon mirror 26, the respective light beams L incident on the polygon mirror 26 are converted into constant-speed scanning lights L by passing through the first imaging lenses 32, 42 and the second imaging lenses 33, 43. These constant-speed scanning lights L are perpendicularly reflected downward by the first reflecting mirrors 34, 44 and reach the second reflecting mirrors 35, 45 through the second apertures 25b formed in the base 25A. Subsequently, the constant-speed scanning lights L are perpendicularly reflected by the second reflecting mirrors 35, 45 to propagate horizontally along the lower surface of the base 25A. Thereafter, the light beams L are perpendicularly reflected upward by the third reflecting mirrors 36, 46 to propagate toward the photoconductive drums 2a, 2b through the first apertures 25a formed in the base 25A. The surfaces of the photoconductive drums 2a, 2b are exposed and scanned by the constant-speed scanning lights L.

The one optical scanning device 13 shown in FIGS. 2 and 3 exposes and scans the photoconductive drum 2a of the magenta image forming unit 1M and the photoconductive drum 2b of the cyan image forming unit 1C shown in FIG. 1. Two similar optical scanning devices 13 are juxtaposed in the color laser printer 1 shown in FIG. 1. By these two optical scanning devices 13, all the four photoconductive drums 2a to 2d including the respective photoconductive drums 2c, 2d of the yellow and black image forming units 1Y and 1Bk are exposed and scanned by light beams L.

Further, the light beams L' for synchronization detection polarized by the polygon mirror 26 are perpendicularly reflected downward by the first reflecting mirrors 34, 44 after being narrowed by passing through the first imaging lenses 32, 42 and the second imaging lenses 33, 43. Subsequently, the light beams L' reach the second reflecting mirrors 35, 45 through the second apertures 25b formed in the base 25A, are perpendicularly reflected by the second reflecting mirrors 35, 45 to horizontally propagate along the lower surface of the base 25A and reach the mirrors 38, 48 for synchronization detection. Thereafter, the light beams L' are reflected by the mirrors 38, 48 for synchronization detection to reach the second reflecting mirrors 35, 45, and perpendicularly reflected again by the second reflecting mirrors 35, 45 to propagate upward and reach the first reflecting mirrors 34, 44 again through the second apertures 25b formed in the base 25A.

Then, the light beams L' are perpendicularly reflected by the first reflecting mirrors 34, 44, horizontally propagate along the upper surface of the base 25A to be introduced to the synchronization detectors 37, 47 and are detected by the synchronization detectors 37, 47. By this detection, the exposure-scanning (writing) start timings on the photoconductive drums 2a, 2b by the light beams L are determined as described above. Here, in this embodiment, the length of the optical paths for synchronization detection from the polygon mirror 26 to the synchronization detectors 37, 47 is set to be substantially equal to that of the optical paths for scanning from the polygon mirror 26 to the photoconductive drums 2a, 2b as shown in FIG. 3.

Further, in the first embodiment, the light transmissive members 49, 50 are respectively fitted in the first and second apertures 25a, 25b. By fitting the light transmissive members 49, 50, a reduction in the rigidity of the base 25A caused by formation of the first and second apertures 25a, 25b is prevented. This results in suppression of the vibration of the optical components such as the first imaging lenses 32, 42, the second imaging lenses 33, 43, the first reflecting mirrors 34, 44, the second reflecting mirrors 35, 45 and the third reflecting mirrors 36, 46 arranged near the first and second apertures 25a, 25b. Thus, color images formed by the color laser printer 1 are free from image degradation such as jitter and high-quality color images are stably obtained.

Further, in this embodiment, the light transmissive members 49, 50 are respectively interference-fitted into the first and second apertures 25a, 25b of the base 25A. Thus, an effect of improving productivity of the optical scanning device 13 is also achieved.

[Optical Scanning Device According to Second Embodiment]

Figure 4:
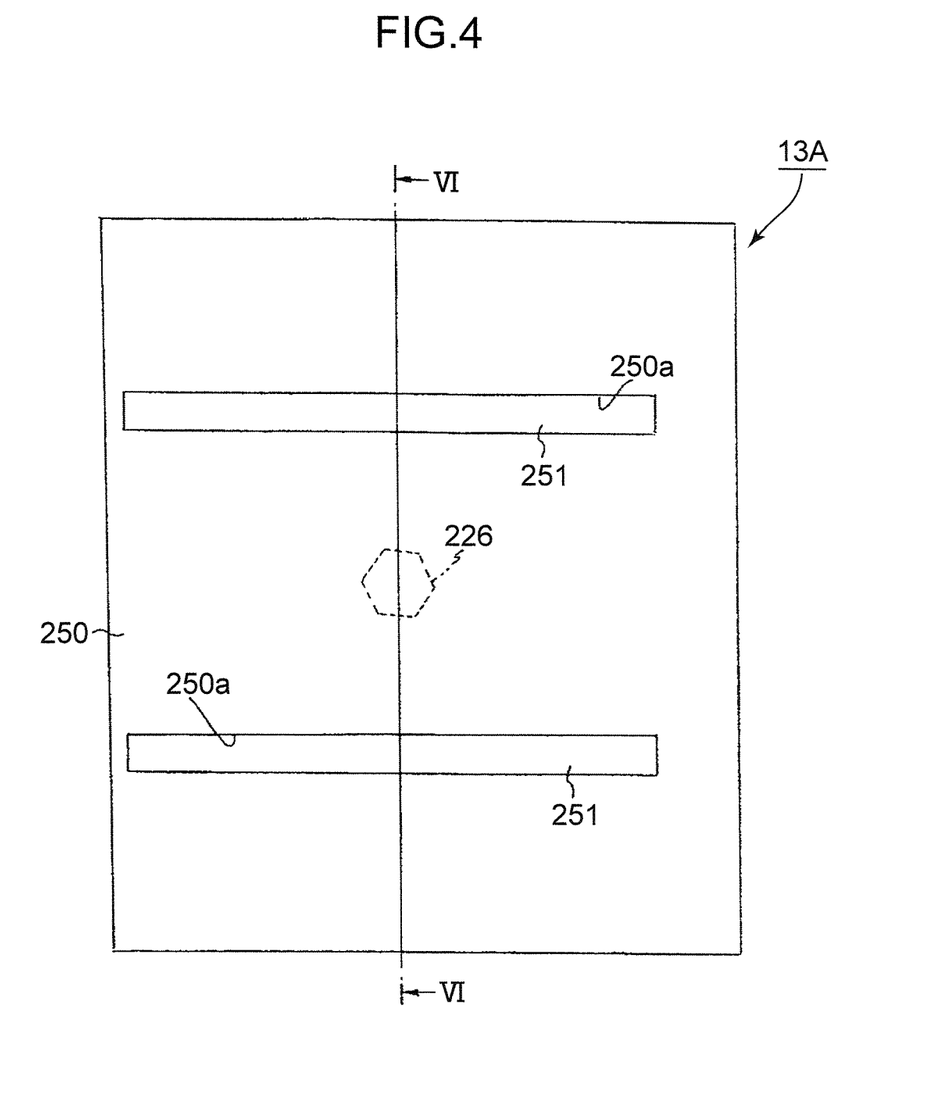
FIG. 4 is a plan view of an optical scanning device according to a second embodiment of the invention.
Figure 5:
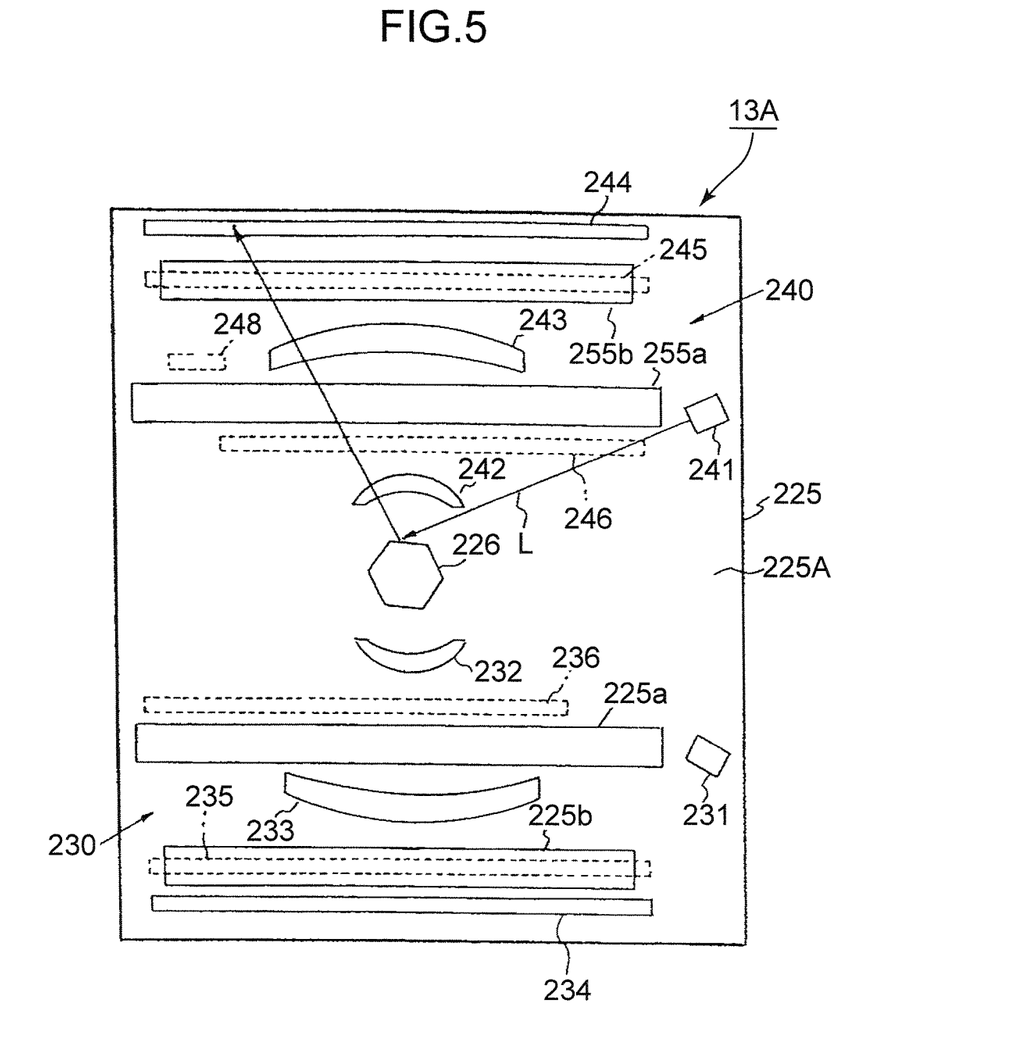
FIG. 5 is a plan view showing the internal structure of the optical scanning device according to the second embodiment.
Figure 6:
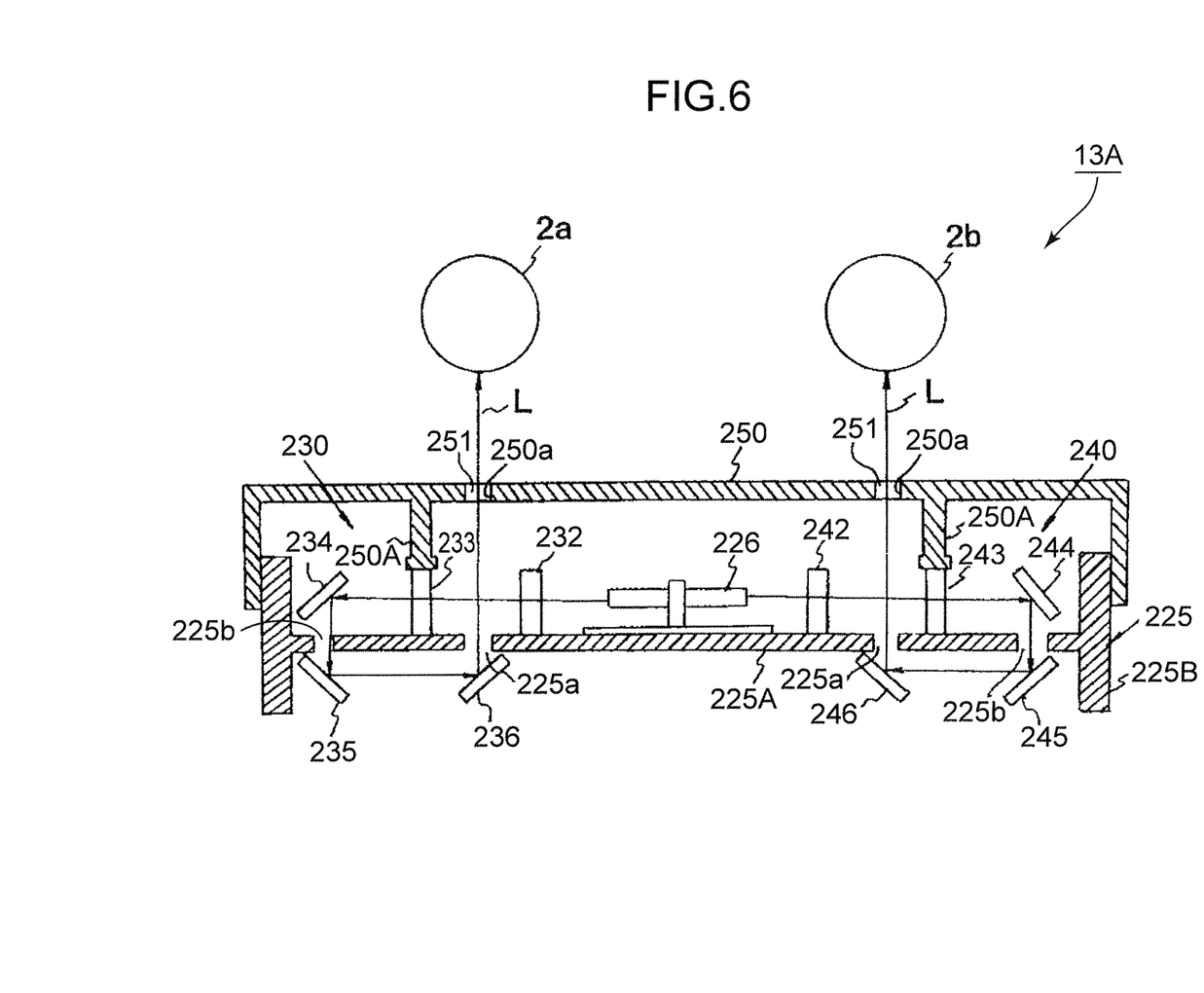
FIG. 6 is a sectional view along VI-VI of FIG. 4.

FIG. 4 is a plan view of one optical scanning device 13A according to a second embodiment, FIG. 5 is a plan view showing the internal structure of the optical scanning device 13A, and FIG. 6 is a sectional view along VI-VI of FIG. 4. In the above first embodiment, the light transmissive members 49, 50 to be fitted into the first and second apertures 25a, 25b of the base 25A are illustrated as reinforcing members. In this second embodiment, pressing portions 250A for pressing a base 225A near first and second apertures 225a, 225b are illustrated as reinforcing members.

The optical scanning device 13A includes an integrally formed housing 225 made of resin. An opening in the upper surface of the housing 225 is closed by an integrally formed lid 250 likewise made of resin (see FIG. 6). As shown in FIG. 6, the housing 225 includes the base 225A which is a horizontal flat plate member partitioning the interior space of the housing 225 into an upper space (first compartment) and a lower space (second compartment) and a frame-shaped side wall 225B surrounding the base 225A. A lateral cross-sectional shape of the base 225A and the side wall 225B is an H shape. A polygon mirror 226 (first optical component) as a polarizer is arranged in a central part of the upper space above the base 225A of the housing 225. Two scanning optical systems 230, 240 (first optical component and second optical component) are symmetrically arranged at the opposite sides of the polygon mirror 226 as a center in the upper and lower spaces partitioned by the base 225A in the housing 225.

The scanning optical systems 230, 240 include laser diodes 231, 241 (light sources) arranged on the upper surface of the base 225A in the housing 225. The laser diodes 231, 241 are arranged in the upper space of the housing 225 and generate beams (light beams L) having a predetermined wavelength. Respective optical components constituting the scanning optical systems 230, 240 are arranged on optical paths of the beams from the laser diodes 231, 241 to the circumferential surfaces of the photoconductive drums 2a, 2b. Note that an unillustrated collimator lens is incorporated into each of the laser diodes 231, 241.

The light beams L emitted from the respective laser diodes 231, 241 are incident on the polygon mirror 226 driven and rotated at a predetermined speed in two symmetrical directions after being collimated into linear beams by the unillustrated collimator lenses. The respective light beams L incident on the polygon mirror 226 are polarized by the polygon mirror 226.

The respective scanning optical systems 230, 240 include first imaging lenses 232, 242, second imaging lenses 233, 243 and first reflecting mirrors 234, 244 arranged along propagation directions of the light beams L in the upper space above the base 225A, and second reflecting mirrors 235, 245 and third reflecting mirrors 236, 246 arranged along the propagation directions of the light beams L in the lower space below the base 225A.

The first imaging lenses 232, 242 and the second imaging lenses 233, 243 convert the light beams L polarized by the polygon mirror 226 into constant-speed scanning lights and focus the constant-speed scanning lights on the circumferential surfaces of the photoconductive drums 2a, 2b. The first reflecting mirrors 234, 244 are mirrors for reflecting the constant-speed scanning lights at 90° so that the scanning lights horizontally propagating in the upper space propagate toward the lower space. The second reflecting mirrors 235, 245 are mirrors for further reflecting the scanning lights reflected by the first reflecting mirrors 234, 244 and incident thereon at 90° and causing them to horizontally propagate in the lower space. The third reflecting mirrors 236, 246 are mirrors for further reflecting the scanning lights reflected by the second reflecting mirrors 235, 245 and incident thereon at 90° and causing them to propagate upward toward the circumferential surfaces of the photoconductive drums 2a, 2b through the upper space.

To enable the above scanning lights to be reflected through the base 225A, the base 225A is formed with two first apertures 225a and two second apertures 225b for allowing the passage of the scanning lights. The first apertures 225a are rectangular apertures long in a main scanning direction (lateral direction in FIG. 4) and arranged on optical paths connecting the third reflecting mirrors 236, 246 and the photoconductive drums 2a, 2b and between the first imaging lenses 232, 242 and the second imaging lenses 233, 243 on the base 225A. The second apertures 225b are rectangular apertures long in the main scanning direction and arranged on optical paths connecting the first reflecting mirrors 234, 244 and the second reflecting mirrors 235, 245.

As shown in FIGS. 4 and 6, a lid 250 for covering an upper side of the upper space of the housing 225 is formed with two aperture windows 250a. The aperture windows 250a are formed right above the two first apertures 225a formed in the base 225A and have the same long and narrow rectangular shape as the first apertures 225a. The respective aperture windows 250a are covered by a transparent and light transmissive dustproof cover 251.

In the optical scanning device 13A according to the second embodiment, the lid 250 arranged to face the base 225A is provided with a plurality of pressing portions 250A as reinforcing members as shown in FIG. 6. The pressing portions 250A are members integrally formed to the lid 250 and projections projecting vertically downward from the upper inner surface of the lid 250 toward the base 225A. These pressing portions 250A are held in contact with the upper surfaces of the second imaging lenses 233, 243 placed near the first apertures 225a of the base 225A of the housing 225 to press these against the base 225A. That is, the pressing portions 250A press the base 225A near the first apertures 225a via the second imaging lenses 233, 234.

Next, functions of the optical scanning device 13A constructed as described above are described. The light beams L emitted from the laser diodes 231, 241 provided in the respective scanning optical systems 230, 240 in one optical scanning device 13A are incident on the polygon mirror 226 driven and rotated at the predetermined speed in two symmetrical directions after being collimated into linear beams by the unillustrated collimator lens.

After being polarized by the polygon mirror 226, the respective light beams L incident on the polygon mirror 226 are converted into constant-speed scanning lights L by passing through the first imaging lenses 232, 242 and the second imaging lenses 233, 243. These constant-speed scanning lights L are perpendicularly reflected downward by the first reflecting mirrors 234, 244 and reach the second reflecting mirrors 235, 245 through the second apertures 225b formed in the base 225A. Subsequently, the constant-speed scanning lights L are perpendicularly reflected by the second reflecting mirrors 235, 245 to propagate horizontally along the lower surface of the base 225A. Thereafter, the light beams L are perpendicularly reflected upward by the third reflecting mirrors 236, 246 to propagate toward the photoconductive drums 2a, 2b through the first apertures 225a formed in the base 225A and the transparent dustproof cover 251 closing the aperture windows 250a formed in the lid 250. The surfaces of the photoconductive drums 2a, 2b are exposed and scanned by the constant-speed scanning lights L.

In the second embodiment, the pressing portions 250A project from the inner surface of the lid 250 and the vicinities of the first apertures 225a of the base 225A, which are easily vibrating parts due to low rigidity, are pressed by the pressing portions 250A. That is, the base 225A is pressed by bringing the bottom ends of the pressing portions 250A into contact with the upper parts of the second imaging lenses 233, 243 placed near the first apertures 225a. Thus, vibration of the second imaging lenses 233, 243 and the first imaging lenses 232, 242 placed on the base 225A is suppressed. Therefore, high-quality color images are stably obtained without the occurrence of image degradation such as jitter in the color images formed by the color laser printer 1 shown in FIG. 1.

[Optical Scanning Device According to Third Embodiment]

Figure 7:
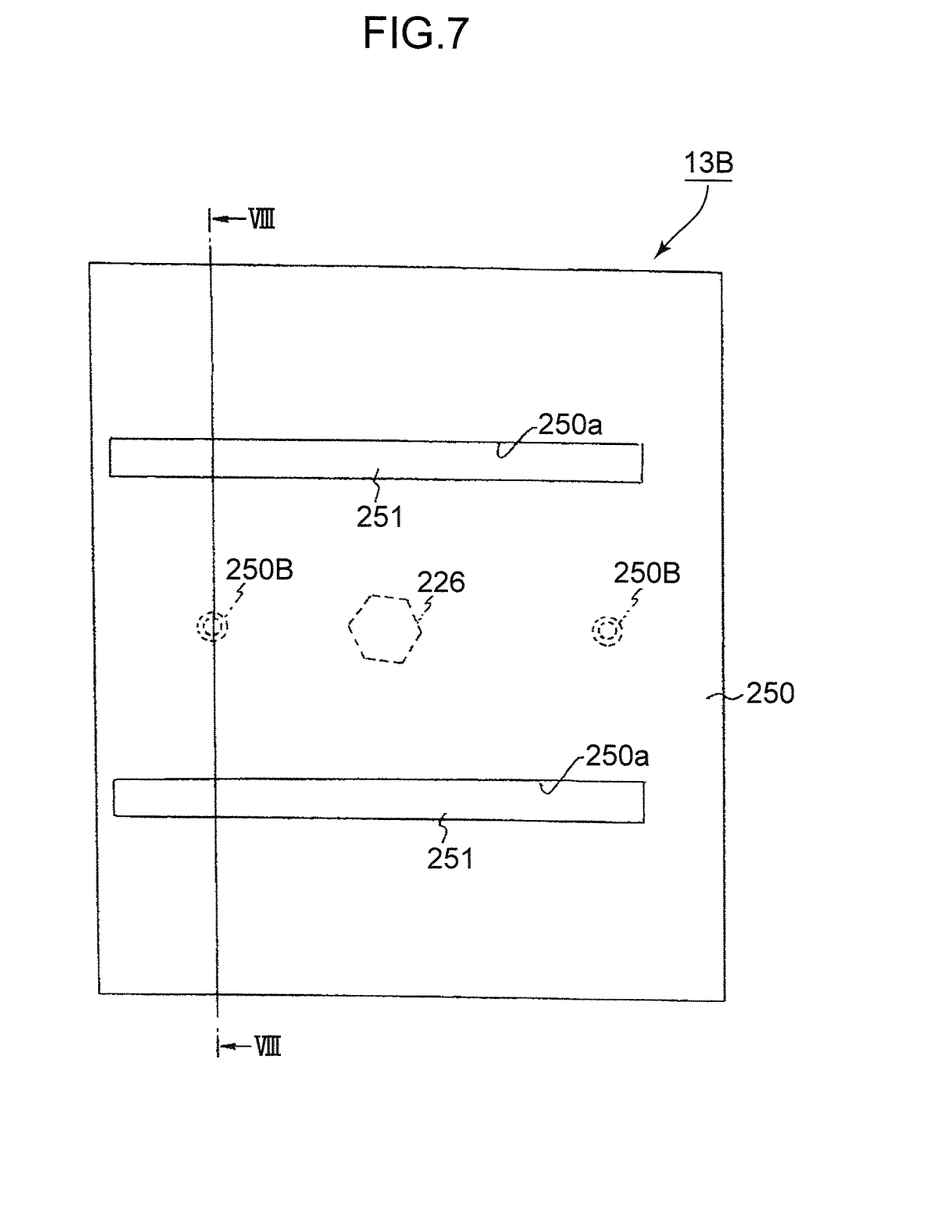
FIG. 7 is a plan view of an optical scanning device according to a third embodiment of the invention.
Figure 8:
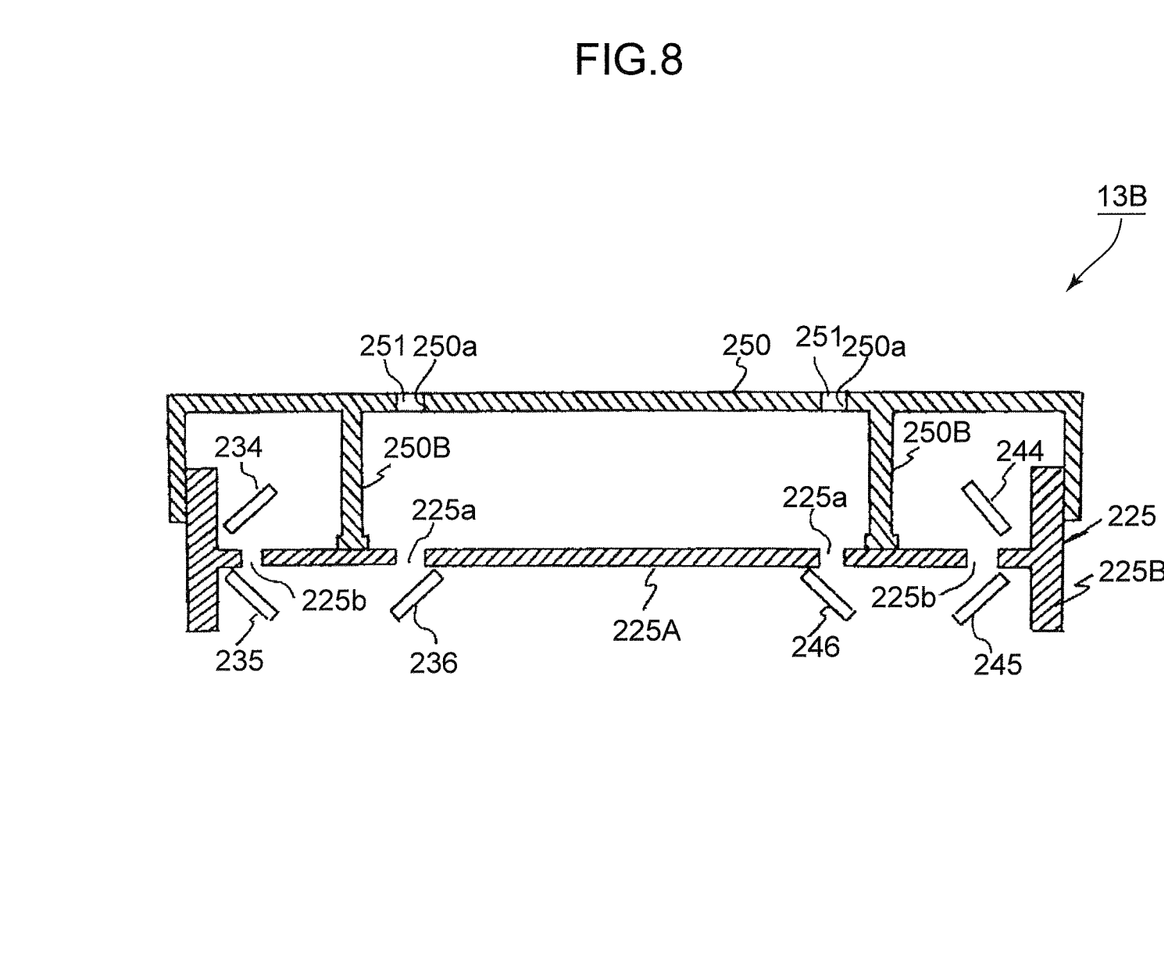
FIG. 8 is a sectional view along VIII-VIII of FIG. 7.

FIG. 7 is a plan view of one optical scanning device 13B according to a third embodiment, and FIG. 8 is a sectional view along VIII-VIII of FIG. 7. In these figures, the same elements as those shown in FIGS. 4 to 6 are identified by the same reference numerals and not repeatedly described below.

The optical scanning device 13B according to the third embodiment includes, as reinforcing members, a plurality of pressing portions 250B which project from the upper inner surface of a lid 250 and directly press a base 225A as shown in FIG. 8. The plurality of pressing portions 250B are members integrally formed to the lid 250 and projections projecting vertically downward from the upper inner surface of the lid 250 toward the base 225A. These pressing portions 250B have a length to reach the upper surface of the base 225A and the bottom ends thereof are in contact with the base 225A near first apertures 225a. Note that the pressing portions 250B are arranged at such position as not to intercept light beams L for scanning on the base 225A of a housing 225 (see FIG. 7), specifically at the opposite sides of a polygon mirror 226 in a main scanning direction.

In the third embodiment, the base 225A of the housing 225 is pressed in a vertical direction by the pressing portions 250B projecting from the inner surface of the lid 250. Thus, a reduction in rigidity caused by formation of first and second apertures 225a, 225b in the base 225A is suppressed to increase a resonance frequency. As a result, effects similar to those of the first and second embodiments are achieved, i.e. vibration of the base 225A and the first imaging lenses 232, 242 and the second imaging lenses 233, 243 placed thereon is suppressed to prevent the occurrence of image degradation such as jitter.

The present invention has been applied to the color laser printer 1 and the optical scanning devices 13, 13A, 13B provided therein above. The present invention is, of course, similarly applicable to arbitrary image forming apparatuses other than color printers and optical scanning devices provided therein.

This application is based on Japanese Patent application Nos. 2010-218425 and 2010-218452 filed in Japan Patent Office on Sep. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical scanning device, comprising:
a housing, the interior of which is partitioned into a first compartment and a second compartment by a base;
a light source arranged in the first compartment and adapted to emit a beam;
a first optical component arranged on an optical path of the beam in the first compartment;
a second optical component arranged on the optical path of the beam in the second compartment;
an upstream aperture formed in the base to allow the beam to pass from the first compartment to the second compartment and a downstream aperture formed in the base to allow the beam to pass from the second compartment to the first compartment; and
a pressing portion for pressing the base between the upstream aperture and the downstream aperture; wherein
the first optical component includes:
a polarizer for polarizing a beam emitted from the light source,
an upstream first imaging lens and a down stream second imaging lens for converting the beam polarized by the polarizer into constant-speed scanning light, the first and second imaging lenses being arranged along a propagation direction of the beam; and
a first reflecting mirror for reflecting the constant-speed scanning light and introducing the constant-speed scanning light reflected by the first reflecting mirror to the second compartment through the upstream aperture;
the second optical component includes:
a second reflecting mirror for further reflecting the constant-speed scanning light reflected by the first reflecting mirror to cause the constant-speed scanning light to propagate along the base, and
a third reflecting mirror for further reflecting the constant-speed scanning light reflected by the second reflecting mirror and introducing the constant-speed scanning light reflected by the second reflecting mirror to a surface to be scanned through the downstream aperture;
the first imaging lens is placed on the base near the polarizer,
the second imaging lens is placed on the base between the upstream aperture and the downstream aperture; and
the pressing portion presses the base via the second imaging lens.

2. An optical scanning device according to claim 1, wherein:
the reinforcing member is a light transmissive member to be fitted into the aperture.

3. An optical scanning device according to claim 2, wherein:
the light transmissive member is interference-fitted in the aperture.

4. An optical scanning device according to claim 2, wherein the light transmissive member is a parallel plate.

5. An optical scanning device according to claim 2, wherein:
the aperture is a rectangular aperture long in a main scanning direction; and
the light transmissive member is a parallel plate having a shape slightly larger than that of the aperture and interference-fitted in the aperture.

6. An optical scanning device according to claim 1, wherein:
the imaging lens is placed on the base near the downstream aperture, and
the pressing portion presses the base near the downstream aperture via the imaging lens.

7. An optical scanning device according to claim 6, wherein:
the housing includes a lid arranged to face the base; and
the pressing portion is a projection projecting from the lid toward the base.

8. An optical scanning device according to claim 6, wherein:
the base is a horizontal flat plate member;
the first compartment is arranged above the second compartment;;
the housing includes a lid for closing an upper part of the first compartment; and
the pressing portion is a projection projecting from the lid toward the base and the bottom end of the projection comes into contact with an upper part of the imaging lens to press the base in a vertical direction via the imaging lens.

9. An optical scanning device according to claim 6, wherein:
the base is a horizontal flat plate member;
the first compartment is arranged above the second compartment;
the housing includes a lid for closing an upper part of the first compartment; and
the pressing portion is a projection projecting from the lid toward the base and the bottom end of the projection comes into contact with the base near the aperture to press the base in a vertical direction.

10. An image forming apparatus, comprising:
an image carrier, on the circumferential surface of which an electrostatic latent image is to be formed; and
an optical scanning device for irradiating the circumferential surface with light; wherein
the optical scanning device includes:
a housing, the interior of which is partitioned into a first compartment and a second compartment by a base;
a light source arranged in the first compartment and adapted to emit a beam;
a first optical component arranged on an optical path of the beam in the first compartment;
a second optical component arranged on the optical path of the beam in the second compartment;
an upstream aperture formed in the base to allow the beam to pass from the first compartment to the second compartment and a downstream aperture formed in the base to allow the beam to pass from the second compartment to the first compartment; and
a pressing portion for pressing the base between the upstream aperture and the downstream aperture; wherein the first optical component includes:
- a polarizer for polarizing a beam emitted from the light source,
- an upstream first imaging lens and a down stream second imaging lens for converting the beam polarized by the polarizer into constant-speed scanning light, the first and second imaging lenses being arranged along a propagation direction of the beam; and
- a first reflecting mirror for reflecting the constant-speed scanning light and introducing the constant-speed scanning light reflected by the first reflecting mirror to the second compartment through the upstream aperture;

the second optical component includes:
- a second reflecting mirror for further reflecting the constant-speed scanning light reflected by the first reflecting mirror to cause the constant-speed scanning light to propagate along the base, and
- a third reflecting mirror for further reflecting the constant-speed scanning light reflected by the second reflecting mirror and introducing the constant-speed scanning light reflected by the second reflecting mirror to a surface to be scanned through the downstream aperture;

the first imaging lens is placed on the base near the polarizer, the second imaging lens is placed on the base between the upstream aperture and the downstream aperture; and the pressing portion presses the base via the second imaging lens.

\* \* \* \* \*